United States Patent [19]

Ratte et al.

[11] Patent Number: 5,704,119
[45] Date of Patent: Jan. 6, 1998

[54] METHOD OF MAKING CONFIGURED LEAD BUSHING FOR BATTERIES

[76] Inventors: Robert W. Ratte, 18 Oriole La., North Oaks, Minn. 55127; Darwin B. Long, 14416 W. Freeway Dr., Forest Lake, Minn. 55025

[21] Appl. No.: 664,741

[22] Filed: Jun. 17, 1996

[51] Int. Cl.⁶ .................................................. H01R 43/16
[52] U.S. Cl. ............................. 29/874; 29/825; 29/876; 29/882; 72/356; 264/273
[58] Field of Search ........................... 29/623.1, 623.4, 29/283.5, 825, 842, 874, 876; 72/344, 356, 395, 357, 358; 164/112, 113; 264/273

[56] References Cited

U.S. PATENT DOCUMENTS 4,284,122  8/1981  Oxenreider et al. ............ 164/113 X
4,422,236  12/1983  Ware, Jr. et al. .................. 29/876
5,349,840  9/1994  Ratte et al. .................. 72/357 X

*Primary Examiner*—W. Donald Bray
*Attorney, Agent, or Firm*—Jacobson & Johnson

[57] ABSTRACT

A method of making a configured lead bushing comprising the steps of die casting a one-piece cup-shaped member having cylindrical side walls and a disk extending across the cup-shaped member and then cutting away the disk from the cup-shaped member to leave an annular lead bushing having an interior surface and an exterior surface which is followed by cutting away portions of the exterior surface to form an outside shoulder and a set of acid rings and cutting away portions of the interior surface to form an interior shoulder on the annular lead bushing.

14 Claims, 4 Drawing Sheets

METHOD OF MAKING CONFIGURED LEAD BUSHING FOR BATTERIES

FIELD OF THE INVENTION

This invention relates to making of bushings and more particular to a method of making a configured lead bushing which is free of voids through a die casting and cutting process.

BACKGROUND OF THE INVENTION

One of the items used in lead batteries is a configured lead bushing which is secured to other lead parts in the battery and to the battery container. In order to have the proper electrical conduction characteristics, the configured lead bushings should have a void free internal structure. Typically, the process of die casting the lead bushing often times leads to voids or cracks in the configured bushing. The present invention provides a process where the configured lead bushing is first die cast to form a cup-shaped blank, and then the blank is selectively machined to form a configured lead bushing free of voids and cracks.

SUMMARY OF THE INVENTION

Briefly, the invention comprises a method of making a configured lead bushing comprising the steps of die casting a one-piece cup-shaped member having cylindrical side walls and a disk extending across the cup-shaped member with the disk being sufficiently massive so that any cracks or voids that form during the casting process occur in the disk rather than in the side walls and then while holding the cup-shaped member, cutting off the disk from the cup-shaped member to leave an annular lead bushing having an interior surface and an exterior surface which is followed by cutting away potions of the exterior surface to form an outside shoulder and a set of acid rings and cutting away portions of the interior surface to form an interior shoulder on the annular lead bushing.

DESCRIPTION OF THE PREFERRED EMBODIMENT

Figure 1:
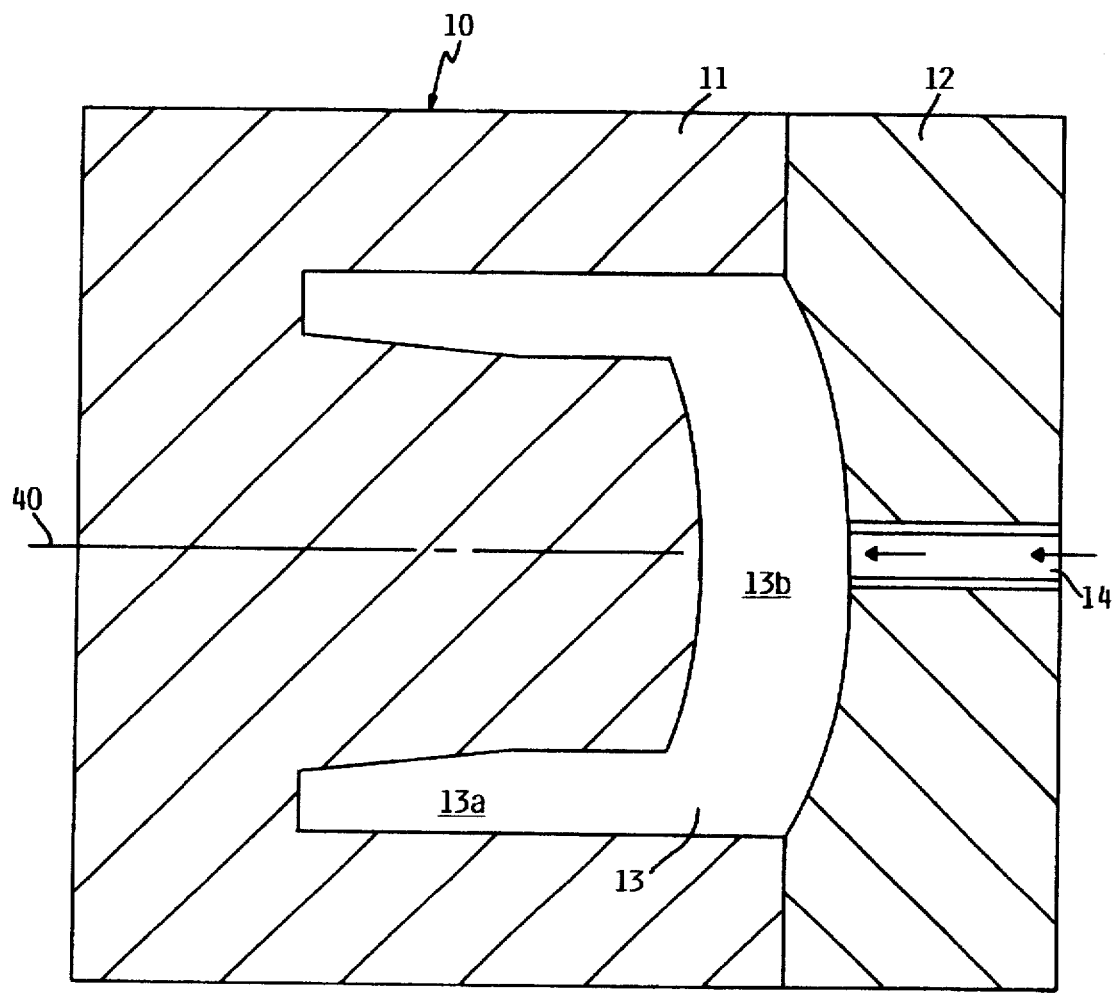
FIG. 1 shows a cross-sectional view of a cup-shaped mold.

FIG. 1 shows a cross-sectional view of a two-piece mold 10 formed of mold part 11 and mold part 12. Mold 10 has a cup-shaped cavity 13 formed by a cylindrical shaped cavity 13a and a disk shaped cavity 13b. Extending through the central potion of mold part 12 is an inlet 14 for directing molten lead into cup-shaped cavity 13.

After forming the cup-shaped mold and the central inlet 14 one injects molten lead under pressure into the mold 10 through the inlet 14 and then allows the lead to solidify to form a one-piece cup-shaped member 20. The mold 10 is shown in the horizontal position with central axis 40 generally parallel to the horizon so that molten lead is directed horizontally inward into the mold cavity and in a direction along axis 40.

Figure 2:
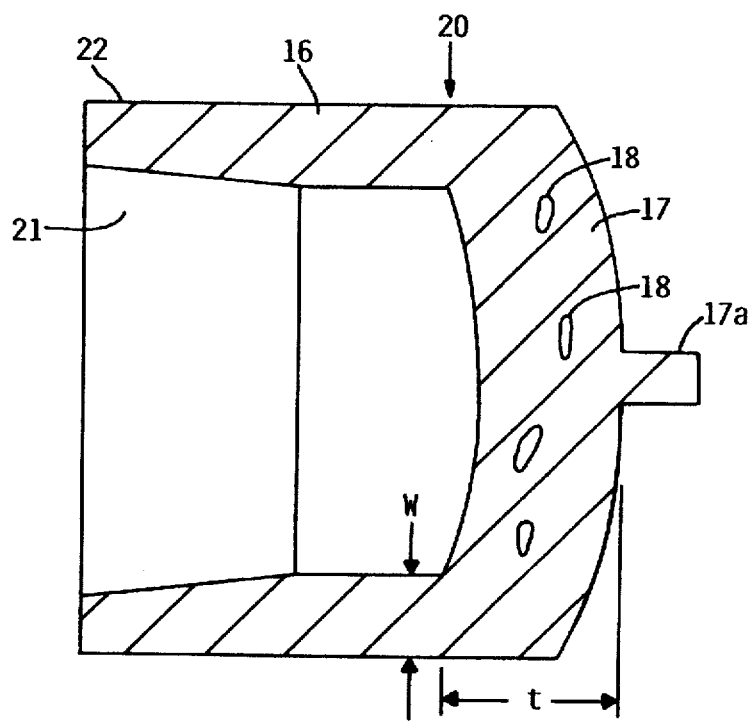
FIG. 2 shows a cup-shaped lead member formed in the cup-shaped mold of FIG. 1.

FIG. 2 shows a cup-shaped member 20 which has been die cast in the mold of FIG. 1. Cup shaped member 20 has cylindrical shaped side walls 16 and a disk 17 extending thereacross to form a cup-shaped member 20. Cylindrical side walls 16 have a thickness designated by w and the disk 17 has a thickness designated by "t". The thickness t is sufficiently large in relation to the width w of the cylindrical side walls 16 so that during the solidification process, the shrinkage and voids 18 occur in the cup-shaped member 20 in disk 17. That is, disk 17 is sufficiently massive so that it remains a source of molten lead for the cylindrical side walls 16 as the lead cools. When the lead member cools, an extension 17a might appear on the end of disk 17.

Figure 3:
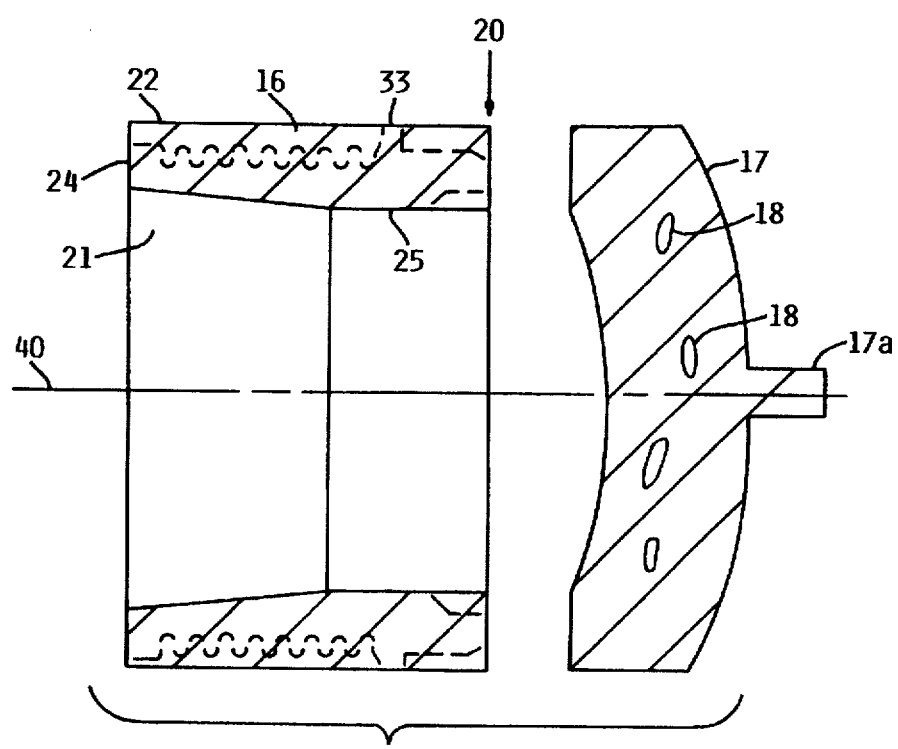
FIG. 3 shows the disk end of the cup-shaped lead member cut away from the cup-shaped lead member to provide an annular member.

FIG. 3 shows the next step in the process where one cuts away the disk 17 from the cup-shaped member 20 to leave an annular lead bushing 12 having an interior surface 21 and an exterior surface 22. The disk 17 is thrown in a scrap lead bin and is recycled for use in a subsequent casting process. FIG. 3 shows, in dotted outline, the final cross-sectional shape of the lead bushing 12 formed by the process. It will be noted that some portions of the final lead bushings 12 are formed by the die casting process such as regions 21, 23, 24, and 25, while the remaining sections are being formed by a machining process. FIG. 3 shows that the outer surface 22 is cylindrical and the inner surface contains two areas, a cylindrical area 25 and a tapered area 21 which is formed during the die casting process. These two areas require no further finishing and can be used to hold the part during the machining process. That is, the part need only be mounted once to complete the machining of the configured bushing. By grasping the part on the area 21 and a portion of area 25, the disk 17 can be cut away, the inside shoulder 21 can be cut away and the outside surface 16 can be machined in one operation thus minimized handling of the part.

Figure 5:
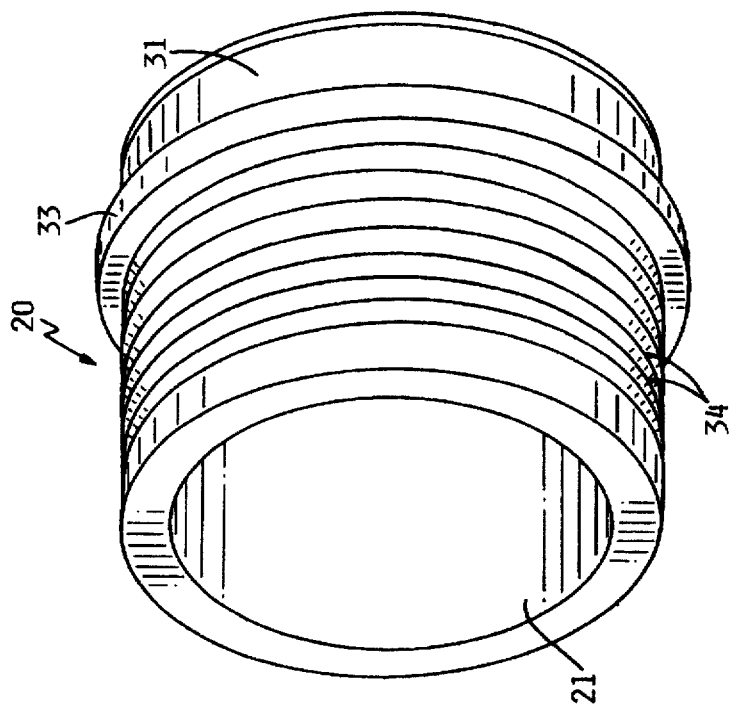
FIG. 5 shows a perspective view of the exterior surfaces and the interior surfaces of the annular member machined to final dimensions.
Figure 4:
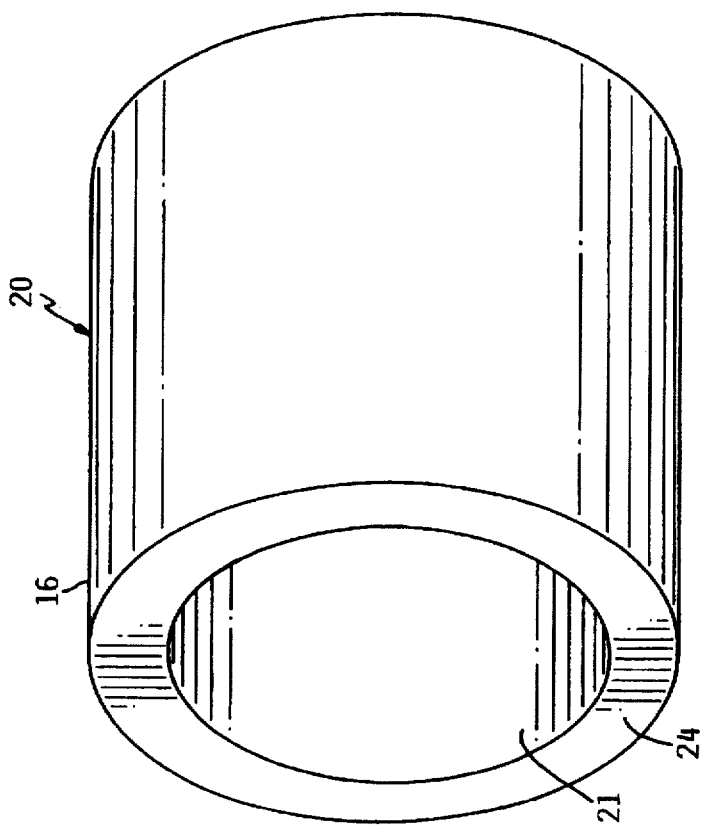
FIG. 4 shows a perspective view of the annular member of FIG. 3.

FIG. 4 shows a perspective view of the cylindrical member prior to the machining process and FIG. 5 shows a prospective view of the configured lead battery bushing 20 after the machining process.

Figure 6:
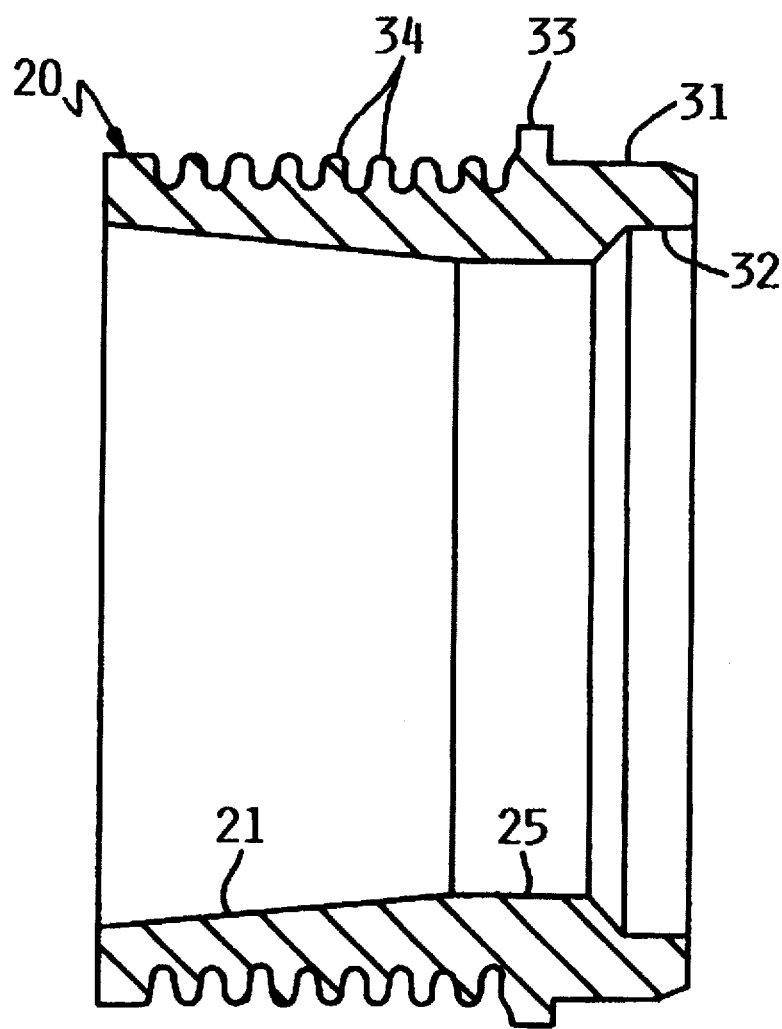
FIG. 6 shows a cross-sectional view of the annular lead bushing formed by the process of the present invention.

FIG. 6 shows a cross-sectional view of configured lead battery bushing 20 with a machined shoulder 31, a die cast top ledge 33 and machined acid rings 34 formed by grooves and ridges formed in the exterior surface of member 20. Located on the interior of configured lead battery housing 20, is a machined inner shoulder 32, a tapered section 35 and a cylindrical surface formed during the die casting of the lead battery bushing 20.

Thus, the process of making the configured lead battery bushing of the present invention comprises the steps of: forming a cup-shaped mold with the cup-shaped mold having a cavity for a cylindrical member and a disk member. One then injects molten lead under pressure into the mold through the inlet port and allows the lead to solidify to form a one-piece cup-shaped member having cylindrically shaped side walls and a disk extending across the side walls with the disk having sufficient thickness so it cools last and thus causes voids and shrinkage introduced into the disk shaped member rather than the cylindrical shaped side walls. After the mold has cooled, one cuts off the disk from the cup-shaped member to leave an annular lead bushing having an interior surface and an exterior surface. To form the configured lead bushing one then cuts away portions of the exterior surface to form a shoulder and a set of acid rings and a portion of the interior surface to form an interior shoulder to thereby produce a battery configuration bushing free of shrinkage and voids.

We claim:

1. A method of making a configured lead bushing comprising the steps of:

forming a cup-shaped mold;

forming a port for molten lead to flow into the cup-shaped mold;

injecting molten lead under pressure into the mold through the port and allowing the lead to solidify to form a one-piece cup-shaped member having cylindrical side walls and a disk extending across the cup-shaped member;

removing the cup-shaped member from the mold with the cup-shaped member having a cylindrical section and a disk section;

cutting away the disk section from the cup-shaped member to leave the cylindrical section having an interior surface and an exterior surface;

cutting away portions of the exterior surface to form a shoulder and a set of acid rings; and cutting away portions of the interior surface to form an interior shoulder.

2. The method of claim 1 including the step of molding a finished surface onto the lead bushing for holding the lead bushing so that the process of cutting away portions of the lead bushing can be accomplished without additional set-up time.

3. The method of claim 1 wherein the disk section is sufficiently more massive than the cylindrical section so that solidification occurs last in the disk section to thereby minimize shrinkage and voids in the cylindrical section.

4. The method of claim 1 wherein the cylindrical side walls of the mold are located in a horizontal condition during the casting and solidification of the cup-shaped member.

5. The method of claim 1 wherein the disk section of the cup-shaped member is cut in a direction perpendicular to a central axis of the bushing.

6. The method of claim 1 wherein the exterior surface is cut with rounded grooves and rounded ridges.

7. The method of claim 1 wherein the lead is injected into a central region of the cavity.

8. The method of claim 1 including the step of forming a two part mold.

9. The method of claim 2 wherein where the cylindrical side walls of the mold are located in a horizontal condition during the casting and solidification of the cup-shaped member.

10. The method of claim 8 wherein the disk section of the cup-shaped member is cut in a direction perpendicular to a central axis of the bushing.

11. The method of claim 9 wherein the exterior surface is cut with rounded grooves and rounded ridges.

12. The method of claim 10 wherein the lead is injected into a central region of the mold.

13. The method of claim 11 including the step of forming a two part mold.

14. A method of making a configured lead bushing substantially free of voids comprising the steps of:

injecting molten lead under pressure into a mold and allowing the lead to solidify to form a one-piece cup-shaped member having cylindrical side walls and a disk extending across the cup-shaped member with the disk having sufficiently larger mass than the cylindrical walls so as to allow the cylindrical side walls to solidify before the disk with the cup shaped member having at least one finished surface for holding the part during subsequent processing of the cup-shaped member;

removing the cup-shaped member from the mold with the cup-shaped member having a cylindrical section and a disk section;

cutting away the disk section from the cup-shaped member to leave the cylindrical section having an interior surface and an exterior surface;

cutting away portions of the exterior surface to form a shoulder and a set of acid rings; and cutting away a portion of the interior surface to form an interior shoulder to thereby form a configured lead bushing.

* * * * *